(12) United States Patent
Nishioka

(10) Patent No.: US 9,113,404 B2
(45) Date of Patent: Aug. 18, 2015

(54) PATH CONTROL SYSTEM, PATH CONTROL DEVICE, COMMUNICATION DEVICE, PATH CONTROL METHOD, AND PROGRAM

(71) Applicant: NEC CORPORATION, Minato-ku, Tokyo (JP)

(72) Inventor: Jun Nishioka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/299,072

(22) Filed: Jun. 9, 2014

(65) Prior Publication Data

US 2014/0286167 A1     Sep. 25, 2014

Related U.S. Application Data

(63) Continuation of application No. 13/147,658, filed as application No. PCT/JP2010/051787 on Feb. 8, 2010, now Pat. No. 8,837,280.

(30) Foreign Application Priority Data

Feb. 9, 2009    (JP) ................................ 2009-027437

(51) Int. Cl.
     *H04L 12/26*      (2006.01)
     *H04W 40/18*      (2009.01)
     *H04L 1/00*      (2006.01)
     (Continued)

(52) U.S. Cl.
CPC ............. *H04W 40/18* (2013.01); *H04L 1/0003* (2013.01); *H04L 45/125* (2013.01); *H04L 45/22* (2013.01); *H04W 8/18* (2013.01);
(Continued)

(58) Field of Classification Search
CPC ... H04W 40/18; H04W 8/18; H04W 28/0215; H04W 40/24; H04W 40/14; H04L 45/125; H04L 45/22; H04L 1/0003
USPC ........................................................ 370/229
See application file for complete search history.

(56) References Cited

U.S. PATENT DOCUMENTS 6,993,293 B1 *   1/2006   Bevan et al. ................ 455/67.11
7,876,682 B2 *   1/2011   Imai .............................. 370/232
(Continued)

FOREIGN PATENT DOCUMENTS

EP           1755238 A1     2/2007
JP           2004363679 A    12/2004
(Continued)

OTHER PUBLICATIONS

International Search Report for PCT/JP2010/051787 mailed Mar. 23, 2010.
(Continued)

*Primary Examiner* — Jay P Patel
(74) *Attorney, Agent, or Firm* — Sughrue Mion, PLLC

(57) ABSTRACT

A path control system according to the present invention includes: a network including a communication device that communicates via a wireless link using adaptive modulation; and a path control device (201) that obtains bandwidth probability that corresponds to a bandwidth and that indicates a stability of the bandwidth with respect to the wireless link, preferentially sets a communication path whose bandwidth probability is higher than a predetermined threshold to the network, and prepares an alternate path for a communication path whose bandwidth probability is lower than the predetermined threshold.

19 Claims, 4 Drawing Sheets

(51) Int. Cl.
  *H04L 12/729* (2013.01)
  *H04L 12/707* (2013.01)
  *H04W 40/24* (2009.01)
  *H04W 8/18* (2009.01)
  *H04W 28/02* (2009.01)
  *H04W 40/14* (2009.01)

(52) U.S. Cl.
  CPC ......... *H04W 28/0215* (2013.01); *H04W 40/24* (2013.01); *H04W 40/14* (2013.01)

(56) References Cited

U.S. PATENT DOCUMENTS

| | | | |
|---|---|---|---|
| 7,961,638 B2* | 6/2011 | Porat | 370/252 |
| 8,279,753 B2* | 10/2012 | Singh | 370/229 |
| 8,279,853 B1 | 10/2012 | Breau et al. | 370/352 |
| 2005/0136961 A1* | 6/2005 | Simonsson et al. | 455/522 |
| 2005/0223089 A1* | 10/2005 | Rhodes | 709/223 |
| 2006/0159020 A1* | 7/2006 | Porat | 370/235 |
| 2006/0250959 A1* | 11/2006 | Porat | 370/230 |
| 2007/0195715 A1 | 8/2007 | Yamano et al. | |
| 2008/0170510 A1* | 7/2008 | Singh | 370/254 |
| 2008/0205268 A1* | 8/2008 | Imai | 370/230 |
| 2008/0273591 A1* | 11/2008 | Brooks et al. | 375/240.01 |
| 2009/0003201 A1* | 1/2009 | Horvitz | 370/229 |
| 2009/0067355 A1* | 3/2009 | Haartsen et al. | 370/311 |
| 2009/0069057 A1* | 3/2009 | Haartsen et al. | 455/574 |
| 2010/0010808 A1* | 1/2010 | Sugiyama et al. | 704/203 |
| 2011/0205933 A1* | 8/2011 | Porat | 370/254 |

FOREIGN PATENT DOCUMENTS

| | | |
|---|---|---|
| JP | 2005175542 A | 6/2005 |
| JP | 2006505221 A | 2/2006 |
| JP | 2006313992 A | 11/2006 |
| JP | 2008512971 A | 4/2008 |
| JP | 2008167451 A | 7/2008 |

OTHER PUBLICATIONS

M. Kodialam et al., "Minimum Interference Routing with Applications to MPLS Traffic Engineering", IEEE INFOCOM 2000, 2000, pp. 884-893.

J. Sangiamwong et al., "QoS-based Adaptive Modulation under Rainfall Environment in Gigabit Millimeter-Wave Broadband Wireless Access System", IEEE RAWCON 2003, 2003, pp. 19-22.

J. Nishioka et al., "A Study on Routing over AMC-enabled FWA Mesh Network", IEICE Technical Report, vol. 108, No. 392, Jan. 2009, pp. 49-54.

S. Jiang et al., "A Prediction-Based Link Availability Estimation for Routing Metrics in MANETs", IEEE/ACM Transactions on Networking, vol. 13, No. 6, Dec. 2005, pp. 1302-1312.

K. Kar et al., "Minimum Interference Routing of Bandwidth Guaranteed Tunnels with MPLS Traffic Engineering Applications", IEEE Journal on Selected Areas in Communications, vol. 18, No. 12, Dec. 2000, pp. 2566-2579.

European search report for EP10738639.3 dated Aug. 22, 2012.

* cited by examiner

PATH CONTROL SYSTEM, PATH CONTROL DEVICE, COMMUNICATION DEVICE, PATH CONTROL METHOD, AND PROGRAM

CROSS-REFERENCE TO RELATED APPLICATIONS

This present application is a Continuation application of Ser. No. 13/147,658 filed on Aug. 3, 2011, which is a National Stage Entry of international application PCT/JP2010/051787, filed Feb. 8, 2010, which claims the benefit of priority from Japanese Patent Application No. 2009-027437 filed on Feb. 9, 2009, the disclosures of all of which are incorporated in their entirety by reference herein.

TECHNICAL FIELD

The present invention relates to a path control system, a path control device, a communication device, a path control method, and a program that causes a computer to execute the method, with respect to a communication network for transmitting data.

BACKGROUND ART

Recent advances in informatization have led to an increase in demand for data communication traffic in data communication and the like. Accordingly, there are network-related needs for broader bandwidths and lower operation costs.

Mobile telephone networks and the like utilize networks constructed by wireless links including Fixed Broadband Wireless Access (FWA) which is based on a wireless scheme utilizing a frequency such as a millimeter waveband that enables broadband transmission.

FIG. 1 is a graph illustrating a correlation between Signal to Noise Ratio (SNR) and the transmission rate of modulation modes.

In the graph illustrated in FIG. 1, an abscissa represents SNR and an ordinate represents bandwidth. A communication quality of a wireless link fluctuates according to an SNR of a reception signal. Adaptive modulation technology is drawing attention as means to realize a wider bandwidth for wireless links. Adaptive modulation technology involves adaptively finding and using a modulation scheme with the highest transmission efficiency based on a wireless status of a wireless link. Adaptive modulation technology enables optimal wireless communication corresponding to a wireless environment to be performed and frequency efficiency to be improved.

If the modulation mode to be used in the future by each wireless link can be predicted, the communication quality of traffic flowing through a network can be guaranteed. An example of a wireless link using adaptive modulation technology is disclosed in JP2006-505221A. As described in this document, since a wireless link using adaptive modulation technology may have a certain degree of correlation with past history, the modulation mode to be used by the wireless link can be predicted (estimated).

Furthermore, as disclosed in JP2004-363679A, the modulation mode can be predicted (estimated) by utilizing weather information.

An example of path control such as that performed in a wired network is disclosed in "Minimum interference routing with applications to mpls traffic engineering" (INFOCOM, 2000) by M. S. Kodialam et al. When path control disclosed in this document is applied to a network constituted by FWA using adaptive modulation technology, unlike when wired, adaptive modulation causes fluctuation in the a communication rate of a wireless link, resulting in congestion or the like and a deterioration of traffic communication quality.

One load distribution scheme by FWA utilizing adaptive modulation is disclosed in JP2006-313992A. This scheme involves having a wireless link in a plurality of routing paths distribute and relay traffic. Such a scheme enables traffic to be distributed and increases the utilization of an entire network.

However, with this scheme, each packet may potentially travel along a different path and a delay jitter or the like may occur. In this case, the scheme is unsuitable for traffic such as VoIP (Voice over IP) that requires a guarantee of communication quality. Such traffic requires path control in which traffic travels along the same path. In addition, using this scheme without modification makes it difficult to estimate what level of priority is sufficient to maintain traffic quality considering that paths cannot be designated, and to maintain and manage communication quality of preferred traffic.

An example of existing technology that takes path control into consideration is presented in "Qos-based adaptive modulation under rainfall environment in gigabit millimeter-wave broadband wireless access system" (IEEE RAWCON, 2003) by J. Sangiamwong et al. This document proposes a path control scheme by FWA having an adaptive modulation function. The scheme proposed in this document involves searching an optimal modulation mode and path for each flow. However, since the scheme provides path control based on the state of a wireless link at the present moment, whether or not the modulation mode can be maintained thereafter is not guaranteed. In addition, the overhead of selecting a modulation mode for each flow at each base station is disadvantageously high.

As described above, technology exists for performing path control by predicting or estimating the modulation mode to be used by a wireless link which varies due to adaptive modulation.

SUMMARY OF INVENTION

Once the transmission rate of a wireless link that performs adaptive modulation is determined, bandwidths equal to or above the transmission rate problematically become unusable and, therefore, are wasted.

An exemplary object of the invention is to provide a path control system, a path control device, a communication device, a path control method, and a program that causes a computer to execute the method which enable high quality communication to be performed in a network constituted by a link whose transmission rate fluctuates.

A path control system according to an exemplary aspect of the invention includes: a network including a communication device that communicates via a wireless link using adaptive modulation; and a path control device that obtains bandwidth probability corresponding to a bandwidth and indicating a stability of the bandwidth with respect to the wireless link, that preferentially sets a communication path whose bandwidth probability is higher than a predetermined threshold to the network, and that prepares an alternate path for a communication path whose bandwidth probability is lower than the predetermined threshold.

In addition, a path control device according to an exemplary aspect of the invention includes: a bandwidth predictor that obtains bandwidth probability corresponding to a bandwidth and indicating a stability of the bandwidth with respect to a wireless link using adaptive modulation in a network including a communication device that communicates via the wireless link; and a path controller that preferentially sets a communication path whose bandwidth probability is higher than a predetermined threshold to the network and that prepares an alternate path for a communication path whose bandwidth probability is lower than the predetermined threshold.

Furthermore, a communication device according to an exemplary aspect of the invention includes: a wireless communicator that communicates via a network by a wireless link using adaptive modulation; a bandwidth predictor that obtains bandwidth probability corresponding to a bandwidth and indicating a stability of the bandwidth with respect to the wireless link; and a path controller that preferentially sets a communication path whose bandwidth probability is higher than a predetermined threshold to the network and that prepares an alternate path for a communication path whose bandwidth probability is lower than the predetermined threshold.

In addition, a path control method according to an exemplary aspect of the invention includes: obtaining bandwidth probability corresponding to a bandwidth and indicating a stability of the bandwidth with respect to a wireless link using adaptive modulation in a network including a communication device that communicates via the wireless link; preferentially setting a communication path whose bandwidth probability is higher than a predetermined threshold to the network; and preparing an alternate path for a communication path whose bandwidth probability is lower than the predetermined threshold.

Furthermore, a program according to an exemplary aspect of the invention causes a computer that sets a communication path to a network including a communication device that communicates via a wireless link using adaptive modulation to: obtain bandwidth probability corresponding to a bandwidth and indicating a stability of the bandwidth with respect to the wireless link; preferentially set a communication path whose bandwidth probability is higher than a predetermined threshold to the network; and prepare an alternate path for a communication path whose bandwidth probability is lower than the predetermined threshold.

DESCRIPTION OF EMBODIMENTS (First Embodiment)

Figure 1:
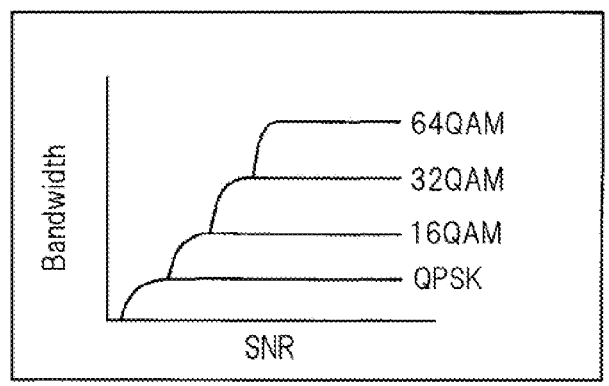
FIG. 1 is a diagram illustrating a correlation between SNR and the transmission rate of modulation modes.
Figure 2:
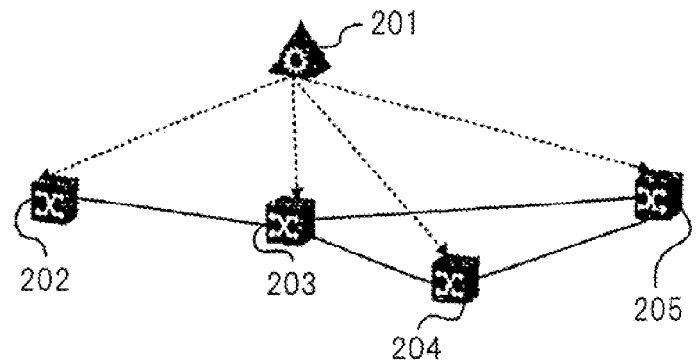
FIG. 2 is a block diagram illustrating a configuration example of a network according to a first embodiment.

A path control system according to the present embodiment will now be described. FIG. 2 is a block diagram illustrating a configuration example of a network according to the present embodiment.

The network illustrated in FIG. 2 includes communication devices 202 to 205 which include a plurality of wireless links and which transfer packets. Path control device 201 that performs path computation is connected wired or wirelessly to each of the communication devices 202 to 205. In FIG. 2, connections by wireless communication between communication devices are denoted by solid lines. Communication devices 202 to 205 are nodes such as a router or a switch.

Figure 3:
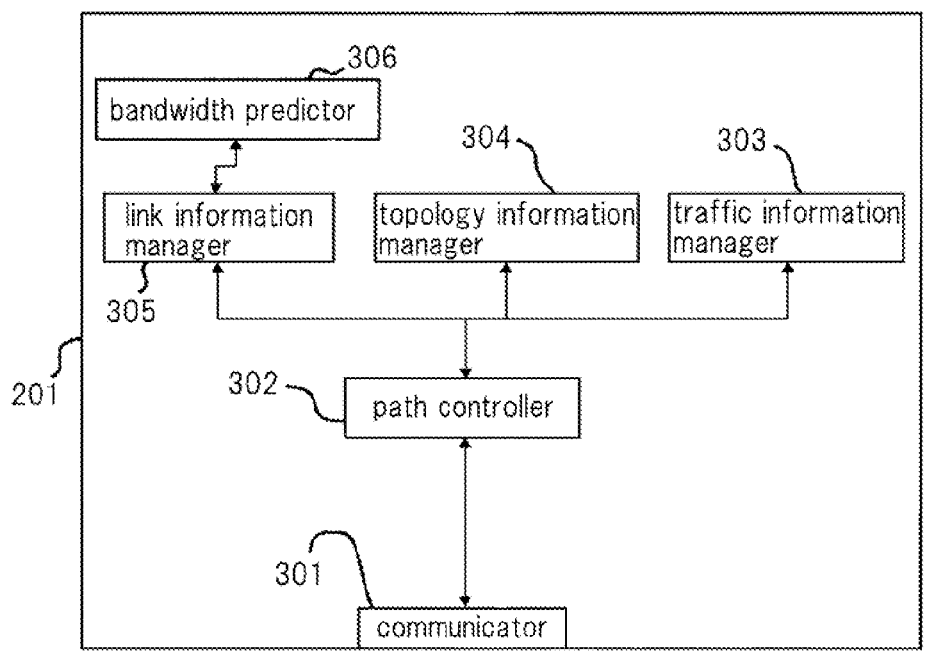
FIG. 3 is a block diagram illustrating a configuration example of a path control device according to the first embodiment.

FIG. 3 is a block diagram illustrating a configuration example of a path control device according to the present embodiment. As illustrated in FIG. 3, path control device 201 includes communicator 301, path controller 302, traffic information manager 303, topology information manager 304, link information manager 305, and bandwidth predictor 306. Path control device 201 transmits and receives data to/from communication devices 202 to 205 via communicator 301.

Traffic information manager 303 manages traffic information including information regarding how much traffic flows through which part of a network, information regarding the transmission source and destination of traffic, and information regarding the used bandwidth and the required bandwidth of traffic.

Topology information manager 304 manages connection information including information regarding the connection relationship among nodes describing how a network is configured.

Bandwidth predictor 306 predicts a future modulation mode based on information held by link information manager 305, computes a bandwidth stability indicating a probability at or above which a bandwidth can be used, and predicts the stability of the link bandwidth. The stability of a bandwidth is referred to as bandwidth probability. A method of predicting a future modulation mode is described in Japanese Patent Application No. 2008-201758. Therefore, a detailed description thereof will be omitted herein.

Link information manager 305 refers to link status information received from a communication device, manages link information including information regarding the bit error rate (BER) of each wireless link, information regarding the currently-used modulation mode, the previously-used modulation mode, and the estimated modulation mode, and information regarding stability of a link bandwidth as predicted by bandwidth predictor 306, and hands over the link information to path controller 302.

Path controller 302 acquires traffic information from traffic information manager 303, acquires information related to the network such as a status, performance, and the like of links constituting the network from topology information manager 304 and link information manager 305 and, based on the acquired information, performs path computation involving computing a path along which traffic travels and path setting involving notifying the path obtained by path computation or the like to a communication device in the network. Path control is performed by path computation and path setting. Network-related information includes link information received from link information manager 305 and connection information received from topology information manager 304.

Moreover, path controller 302, traffic information manager 303, topology information manager 304, link information manager 305, and bandwidth predictor 306 respectively include a storage (not shown) for recording information and a dedicated circuit based on operations of the respective components. Operations of at least a part of the components described above may be arranged to be performed by having a CPU (Central Processing Unit) (not shown) execute a program. In this case, the program is stored in the storage (not shown) and the CPU (not shown) is provided inside the path control device.

The prediction of stability of a bandwidth of each wireless link by bandwidth predictor 306 and the notification of the prediction result by link information manager 305 to path controller 302 is a feature of the present embodiment. It is also a feature of the present embodiment that path controller 302 cooperates with link information manager 305 to search and set a communication path to ensure that the communication quality of traffic requiring bandwidth guarantee is guaranteed at or above a certain level of stability.

Next, configurations of communication devices 202 to 205 will be described. Since communication devices 202 to 205 share the same configuration, the configuration of communication device 202 will be described as a representative device.

Figure 4:
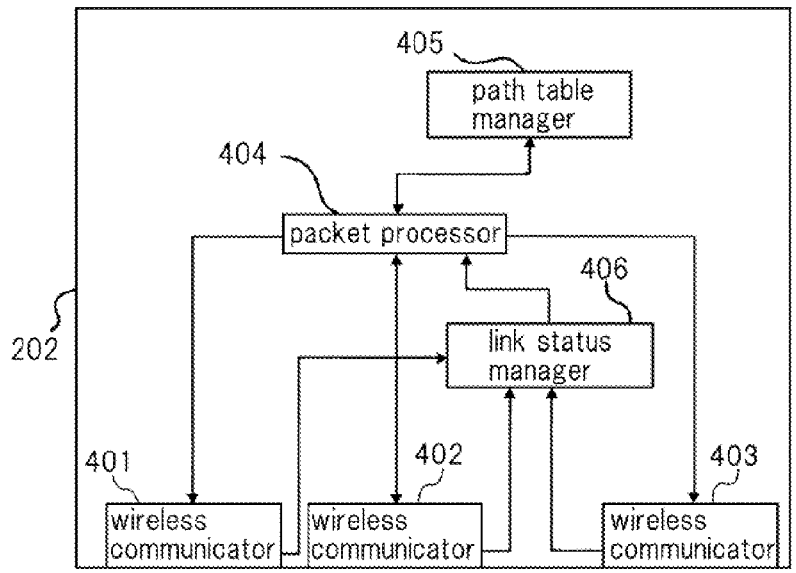
FIG. 4 is a block diagram illustrating a configuration example of a communication device illustrated in FIG. 2.

FIG. 4 is a block diagram illustrating a configuration example of the communication device illustrated in FIG. 2. As illustrated in FIG. 4, communication device 202 includes wireless communicators 401 to 403 that correspond to a plurality of wireless links, packet processor 404 that performs packet transfer, path table manager 405 that manages a path table indicating a path for packet transfer, and link status manager 406.

Wireless communicators 401 to 403 include an adaptive modulation function and, as a modulation mode of a wireless link, either uses a modulation mode set in advance or dynamically varies modulation modes according to the wireless environment.

Path table manager 405 manages a proprietary path table, and when receiving a notification regarding information regarding a new path from path control device 201, updates the path table according to the received notification. In addition to information regarding a newly set path, information regarding an alternate path to be changed when transmission rate declines or the like is also recorded.

Link status manager 406 regularly monitors states of proprietary wireless communicators 401 to 403, records states and modulation mode prediction information regarding the wireless communicators 401 to 403, and manages link status information including information regarding packet transfer, update of the proprietary path table, a BER of proprietarily-managed links, the modulation mode in use, and stability of bandwidth use. Link status manager 406 monitors wireless communicators 401 to 403 and, when detecting a change in transmission rate due to adaptive modulation, notifies the information to path table manager 405. The notification of information regarding the detection of a change in transmission rate by link status manager 406 to path table manager 405 is a feature of the present embodiment. Moreover, link status manager 406 may include a bandwidth stability computing function that is included in bandwidth predictor 306 of path control device 201.

Packet processor 404 processes packet transfer according to the path table managed by path table manager 405. In addition, packet processor 404 transmits link status information managed by link status manager 406 to path control device 201 either periodically or in response to a change in traffic.

Since path table manager 405 is aware of a bandwidth used by each flow, path table manager 405 is able to recognize traffic that is to be affected when being notified that the transmission rate has declined. In this case, the path of the traffic is changed to an alternate path set in advance. In addition, when traffic currently using an alternate path can be restored to an original path due to an improvement in transmission rate, the path of the traffic is changed. Furthermore, when there are no other paths that can be used by traffic affected by a decline in the transmission rate due to adaptive modulation, transfer of the traffic is stopped at the communication device.

Moreover, packet processor 404, path table manager 405, and link status manager 406 respectively include a storage (not shown) for recording information and a dedicated circuit based on operations of the respective components. Operations of at least a part of the components described above may be arranged to be performed by having a CPU (not shown) execute a program. In this case, the program is stored in the storage (not shown) and the CPU (not shown) is provided inside the communication device.

Figure 5:
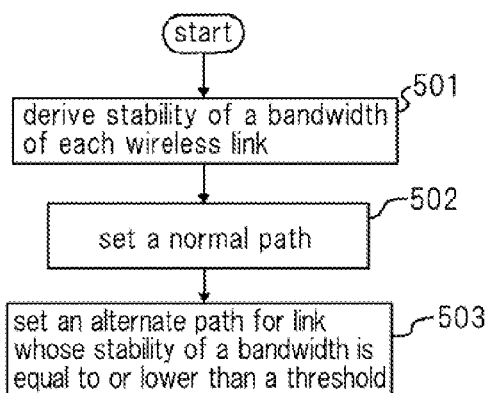
FIG. 5 is a flow chart illustrating an operation procedure of a path control device according to the first embodiment.

Next, operations of path control device 201 according to the present embodiment will be described. FIG. 5 is a flow chart illustrating an operation procedure of the path control device according to the present embodiment.

As illustrated in FIG. 5, bandwidth predictor 306 derives stability of a bandwidth (bandwidth probability) of each wireless link (step 501), and path controller 302 determines the path of traffic (step 502). In the path determination procedure in step 502, a path is searched so as to select a bandwidth with the highest possible stability. Alternate paths are searched for links that use a bandwidth whose stability is equal to or lower than a preset threshold among paths obtained by the search (step 503).

Normally, for a wireless link that performs adaptive modulation, at least a modulation mode is maintained which realizes the lowest transmission rate among modulation modes assumable by the wireless link. In consideration thereof, link bandwidths are divided into a bandwidth that can be secured by a modulation mode having the minimum transmission rate among a set of modulation modes M and a bandwidth that can be secured by the current modulation mode or the predicted modulation mode. Among the two divided bandwidths, while the stability of the former bandwidth may be assumed to be 100%, stability of the latter bandwidth must be predicted or estimated.

Methods of computing stability of a bandwidth usable by a wireless link that performs adaptive modulation can be broadly divided into the following three methods: 1) a method using statistical information; 2) a method using past history information; and 3) a method using weather prediction information.

"1) The method using statistical information" that is the first derivation method uses an average and a variance of the distribution of a modulation mode used by a wireless link when the distribution is apparent as in a case of normal distribution. The use of an average and a variance enables the probability of the transmission rate of a link to be obtained. If an average is denoted by $\mu$ and a variance by $\sigma$, then the predicted (estimated) mode has a probability of 84.12% of being equal to or above $\mu\text{-}\sigma$, a probability of 95.44% of being equal to or above $\mu\text{-}2\sigma$, and a probability of 99.74% of being equal to or above $\mu\text{-}3\sigma$.

If a transmission rate realized by a modulation mode m is denoted by R(m), since a bandwidth BW(m) that becomes usable by using the modulation mode m is the difference in transmission rates from a modulation mode m−1, $$BW(m) = R(m) - R(m-1) \ldots \text{(if } m > 0)$$
$$= R(m) \ldots \text{(if } m = 0)$$

is true.

Therefore, a bandwidth BW([μ−3σ]) whose stability is 99.74% may be expressed as BW([μ−3σ])=R([μ−3σ])−R(0). In addition, a bandwidth BW([μ−2σ]) whose stability is 95.44% may be expressed as BW([μ−2σ])=R([μ−2σ])−R([μ−3σ]). A bandwidth BW([μ−σ]) whose stability of R([μ−σ])−R([−2σ]) is 84.12% may be expressed as BW([μ−σ])=R([μ−σ])−R([μ−2σ]).

As "2) the method using past history information" that is the second derivation method, a method is conceivable such as deriving a predicted (estimated) mode using the history of a modulation mode previously used by a wireless link. If a set of modulation modes is denoted by M and a time period, in which each modulation mode had been used for a certain period of time T, is denoted by T_m, then a probability of being equal to or above the modulation mode may be expressed as a value obtained by dividing the sum ΣT_m (where m denotes a higher modulation mode) of proprietary T_m of the mode and T_m of modulation modes having a higher transmission rate than the mode by T. These values represent the stability of a bandwidth that can be additionally secured by a transmission rate realized by the respective modulation modes.

In other words, stability of a bandwidth BW(m)=R(m)−R(m−1) that can be secured by a modulation mode m may be expressed as ≤T_m/T. Moreover, when m=0, then BW(m)=R(m) is true.

This derivation method can also be realized by using a past BER of each modulation mode as past history information and predicting a modulation mode. In addition to BER, an SNR or a Carrier to Interference-plus-Noise Ratio (CINR) may be used as information indicating a radio wave environment, or a plurality of types of such information may be combined. Information indicating a radio wave environment is managed by link information manager 305.

"3) The method using weather prediction information" that is the third and last method uses existing weather forecasts. In this method, a probability of a modulation mode predicted to be used by a wireless link is obtained using information regarding the probability of precipitation such as a rainfall area and positional information of the wireless link, whereby the bandwidth that can be secured at a transmission rate realized by the modulation mode represents stability of the bandwidth.

After classifying link bandwidths according to the above methods, when traffic, whose path is searched, is to use a bandwidth whose stability is equal to or lower than a preset threshold, a path that differs from a link of the traffic is additionally searched.

Path controller 302 of path control device 201 notifies path information that is information regarding a path set by path control to communication devices (nodes) 202 to 205. Each node updates the path table based on path information received from path control device 201. Subsequently, the state of a wireless link is monitored, and when the transmission rate declines due to adaptive modulation, traffic using a bandwidth that is to become unusable due to the decline in transmission rate is switched to an alternate path set in advance. After switching paths, when the transmission rate of the link increases this time due to repeated adaptive modulation, the traffic is returned to the original path.

As described above, in the present embodiment, the bandwidth of a link is evaluated as to how reliable the bandwidth is, and usable bandwidths are classified according to reliability. When bandwidths are classified into high-reliability bandwidths whose reliability equals or exceeds a certain level and bandwidths with lower reliability, if a traffic uses a high-reliability bandwidth, a path that differs from the link of the traffic is not set. On the other hand, by preparing a path that differs from a link of a traffic which uses a low-reliability bandwidth, if the bandwidth of the link becomes unusable due to a decline in the transmission rate caused by adaptive modulation, reliability provided to all traffic in the network will be improved by causing the traffic to use the path prepared in advance.

With a wireless link using adaptive modulation, a proprietary bandwidth of a link does not remain constant because temporal variations in the transmission rate occur. Therefore, for each link, a probability of being equal to or above a certain bandwidth is first obtained in order to evaluate a reliability of the bandwidth. In other words, bandwidths are classified according to probability with respect to a link into, for example, bandwidths usable at a probability of 100%, bandwidths usable at a probability of or above 90%, and bandwidths usable at a probability of or above 80%. Subsequently, when performing path setting on new traffic, a bandwidth to be allocated to the new traffic is determined based on bandwidths already allocated with respect to the link. Since new traffic is able to use a link until the bandwidth becomes unusable due to a decline in transmission rate, the stability at which the bandwidth can be used becomes, without modification, the stability at which the link can be used. If the stability of a bandwidth used by the new traffic does not satisfy a threshold set in advance by the new traffic at each link on a path that is set to the new traffic, then a path that differs from the link is set. Subsequently, when the transmission rate declines due to adaptive modulation at each link, by diverting traffic affected by the decline in transmission rate to an alternate path set in advance, communication quality of the traffic can be maintained. As a result, communication quality can be improved in comparison to a case where diversion to an alternate path is not performed.

At each link, since an alternate path is only set to traffic affected by a decline in transmission rate due to adaptive modulation, used bandwidths can be reduced as compared to a case where preliminary paths are set for all paths. In addition, since even low-stability bandwidths that cannot be used independently can now be effectively used by combining with other alternate paths as described above, a greater amount of traffic can be sent over the network.

Furthermore, since it is known, which portion of which link bandwidth is being used by traffic at each link, the impact of a decline in transmission rate due to adaptive modulation to traffic can be immediately detected even without the use of signaling and the impact to traffic can be kept to a minimum.

An advantage offered by the present embodiment will now be described with reference to the network illustrated in FIG. 2.

When sending traffic R from communication device 202 to communication device 205, there are two conceivable paths, namely, communication device 202—communication device 203—communication device 205 and communication device 202—communication device 203-communication device 204—communication device 205. Hereinafter, for example, a path between communication device 202—communication device 203 will be denoted by "path 202-203".

Now, it is assumed that a transmission rate of path 202-203 is constant at 2 R, a transmission rate of path 203-205 varies between R/2 and 2 R due to adaptive modulation, and respective transmission rates of path 203-204 and path 204-205 vary between R/2 and 3/2 R. In this case, the maximum amount of traffic that can be sent without being affected by a decline in transmission rate due to adaptive modulation is the sum R of traffic R/2 respectively sent via path 202-203-205 and path 202-203-204-205.

However, supposing that changes in the transmission rates of path 203-204-205 and path 203-205 occur independently from each other but the probability of such changes occurring simultaneously is low enough to be negligible, then in this case one of the two paths is to be always usable. In this case, by setting path 203-205 as a normal path and securing, in advance, path 203-204-205 as an alternate path in the event the transmission rate of path 203-205 declines, the maximum traffic of R can be newly and additionally sent. In other words, total traffic of 2 R can be sent between communication device 202 and communication device 205 until the transmission rate of path 203-205 drops to R/2, and a switchover to the alternate path may be made immediately once the transmission rate of path 203-205 drops to R/2.

As shown, in the present embodiment, even when there is a low-stability bandwidth that cannot be used independently, the bandwidth becomes usable by additionally providing an alternate path that has a low correlation of reduction in transmission rate with the link, utilization of the network as a whole can be increased.

In addition, since paths through which traffic flows can be controlled by path control, the communication quality of traffic can be readily guaranteed, unlike load distribution in packet units.

(Second Embodiment)

The present embodiment is configured such that each communication device includes the function of the path control device illustrated in FIG. 3, and path control is performed in a distributed manner.

Figure 6:
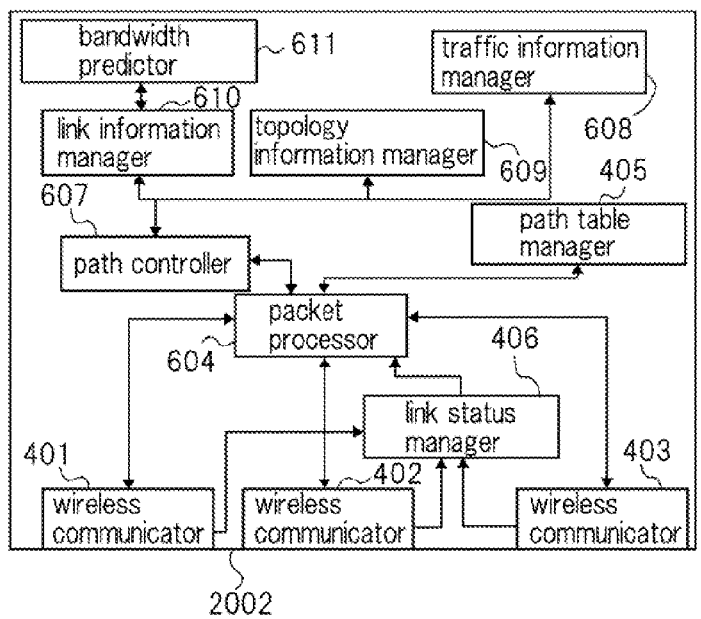
FIG. 6 is a block diagram illustrating a configuration example of a communication device according to a second embodiment.

A configuration of a communication device according to the present embodiment will now be described. FIG. 6 is a block diagram illustrating a configuration example of a communication device according to the present embodiment. Components similar to those of the first embodiment are denoted by similar reference numerals and a detailed description thereof will be omitted.

Communication device 2002 illustrated in FIG. 6 is provided in place of respective communication devices 202 to 205 illustrated in FIG. 2. In addition to the components illustrated in FIG. 4, communication device 2002 includes path controller 607, traffic information manager 608, topology information manager 609, link information manager 610, and bandwidth predictor 611.

Path controller 607 corresponds to path controller 302, traffic information manager 608 corresponds to traffic information manager 303, topology information manager 609 corresponds to topology information manager 304, link information manager 610 corresponds to link information manager 305, and bandwidth predictor 611 corresponds to bandwidth predictor 306 respectively included in path control device 201 illustrated in FIG. 3. In the present embodiment, a detailed description of these components will be omitted.

Operations of the communication device according to the present embodiment will now be briefly described.

When receiving a message such as an admission request from the outside for obtaining permission to use the network via wireless communicator 401 and packet processor 604, path controller 607 performs path control executed by path control device 201 in the first embodiment. Subsequently, in the present embodiment, path information that is information regarding a path set due to path control is notified to other communication devices.

(Third Embodiment)

In the present embodiment, a table indicating stability corresponding to a combination of modulation modes is prepared, whereby a path is set with reference to the table. In the present embodiment, differences from the first embodiment will be described.

With path control device 201 according to the present embodiment, link information manager 305 collects information regarding the proprietary modulation mode of each wireless link on a network and modulation modes used by other links, and stability of combinations of the modulation modes are obtained and managed as a table. This table is referred to as a combination stability table. Subsequently, the path controller 302 obtains a combination with an alternate path using the combination stability table created by link information manager 305.

FIRST EXAMPLE

Figure 7:
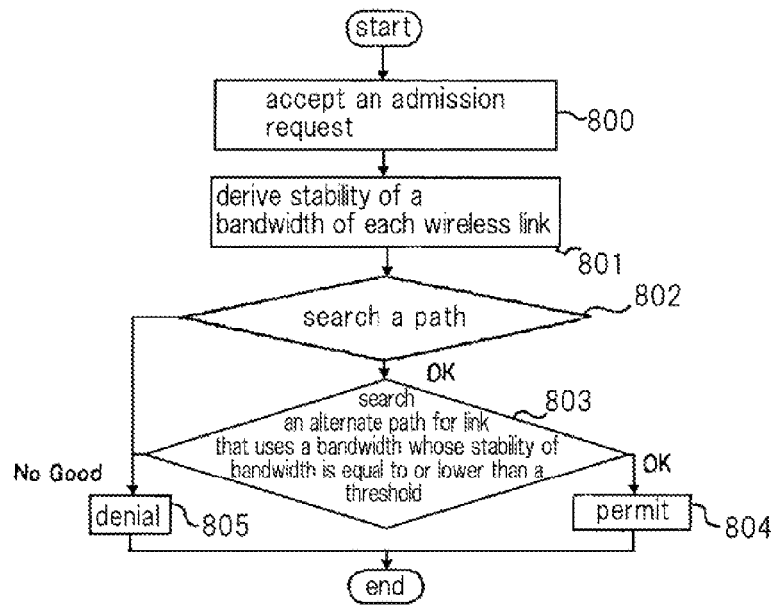
FIG. 7 is a flow chart illustrating an operation procedure in a path control method according to a first example.

In the present example, a path control operation including control with respect to an admission request by path control device 201 described in the first embodiment will be described. FIG. 7 is a flow chart illustrating an operation procedure of a path control method according to the present example.

When path control device 201 accepts an admission request via communicator 301 from the outside (step 800), bandwidth predictor 306 computes the stability of a bandwidth that can be used by each wireless link (step 801). Subsequently, path controller 302 searches a path based on the computed bandwidth stability (step 802). With the exception of links without sufficient excess bandwidth for passing traffic, a path is searched using Dijkstra's method or the like.

When a path is found through the operation of step 802, path controller 302 searches an alternate path for links that require alternate paths due to reasons such as stability of a bandwidth to be used on the found path being equal to or lower than a required threshold (step 803). The admission request is permitted when both paths are found (step 804). Conversely, the admission request is denied when a path is not found (step 805).

When the path search is successful, path controller 201 sends a message including path information indicating traffic and a path to be followed by the traffic to all communication devices on the searched path so as to enable the traffic to follow the searched path, and causes each communication device to update the path table.

Figure 8:
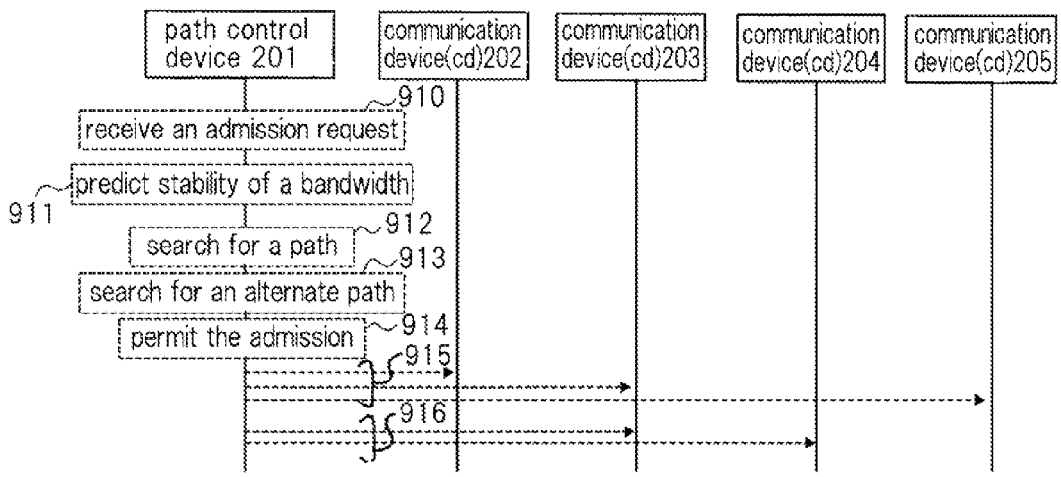
FIG. 8 is a sequence diagram illustrating an operation procedure when path control according to the first example is performed on the network illustrated in FIG. 2.

A path control operation in a case where the path control according to the present example is performed on the network illustrated in FIG. 2 will now be described. FIG. 8 is a sequence diagram illustrating an operation procedure when path control according to the present example is performed on the network illustrated in FIG. 2. The diagram illustrates a case where a path is set between communication device 202 and communication device 205.

Upon receiving an admission request for traffic from the outside (step 910), path control device 201 accepts the request and predicts stability of the bandwidth (bandwidth probability) of a wireless link (step 911). Subsequently, a search is performed for a path that satisfies the request (step 912), and a search for an alternate path is performed for each link using a bandwidth whose stability is equal to or lower than a threshold required by the traffic (step 913). When the paths are found, permission for admission is issued for the request flow (step 914), a path table update notification is made to communication devices on the paths (step 915), and the alternate path is set (step 916).

Moreover, there are several methods for computing stability of a bandwidth usable by each wireless link in the bandwidth prediction operation performed in step 911 illustrated in FIG. 8. One such method will now be described. Let us simply assume that modulation modes m1, m2, and m3 are available for use by each wireless link, the modulation mode m1 having the lowest transmission rate among the modulation modes is at least maintained, the probability of use of the modulation mode m2 that is higher than m1 or a higher modulation mode is 90%, and the probability of use of m3 is 80%.

In this case, if $R(m1)$ denotes a transmission rate of modulation mode m1, since bandwidth $BW(m1)$ that can only be used at or above m1 among link bandwidths is $R(m1)$, $BW(m1)=R(m1)$ is true, indicating that the probability of the bandwidth of the portion that is usable or, in other words, the stability thereof is 100%. On the other hand, since bandwidth $BW(m2)$ that can only be used by using modulation mode m2 is a difference between transmission rates that are respectively realized by modulation modes m2 and m1, $BW(m2)=R(m2)-R(m1)$ is true, indicating that stability of the bandwidth of the portion is 90%. In a similar manner, bandwidth $BW(m3)$ that can only be used by using the modulation mode m3 may be expressed as $BW(m3)=R(m3)-R(m2)$.

When setting a path for traffic in a case where, for example, stability required by the traffic is 90%, if a bandwidth in $BW(m1)$ and $BW(m2)$ portions is to be used, an alternate path is not required since the stability satisfies the threshold. On the other hand, the stability is only 80% when the traffic is to use a bandwidth in $BW(m3)$ portion. Therefore, an alternate path must be prepared to have the traffic flow through the network at a higher stability.

While a bandwidth to be used by traffic is basically determined on a FCFS (First Come First Serve) basis, the bandwidth to be used by traffic may be determined instead by providing traffic classes or the like.

In addition, a determination may be made as follows. After setting a path as described above, at each node, when the modulation mode of a wireless link changes from m3 to m2 due to adaptive modulation, the path of the traffic using a bandwidth in the $BW(m3)$ portion is switched to an alternate path set in advance. Subsequently, when the modulation mode of the wireless link recovers to m3, the original path is restored. Specifically, link status manager 406 of each communication device monitors a wireless link, and when the modulation mode used by the wireless link changes, link status manager 406 notifies information thereof to path table manager 405. Based on the information, for each flow of traffic, path table manager 405 judges whether to have the traffic use the normal path or the alternate path, and notifies which path is to be used to packet processor 404.

Furthermore, when traffic is to use a bandwidth with a stability of 100% for all paths, the communication quality of traffic can be maintained without being affected by adaptive modulation.

SECOND EXAMPLE

The present example represents a case where, instead of performing path computation every time traffic occurs, all paths are obtained using traffic demand information known in advance after predicting the stability of bandwidths usable by links. Moreover, since the present example is an example of the first embodiment, a detailed description of a configuration thereof will be omitted.

Figure 9:
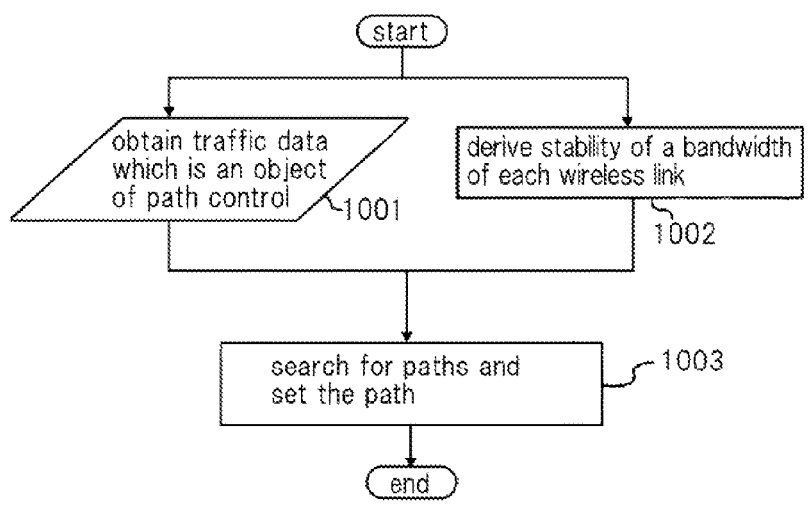
FIG. 9 is a flow chart illustrating an operation procedure in a path control method according to a second example.

An operation procedure of path control according to the present example will now be described. FIG. 9 is a flow chart illustrating an operation procedure of a path control method according to the present example.

Path control device 201 obtains traffic demand information (traffic data) indicating an eventual volume of traffic (step 1001), obtains information regarding the stability of a bandwidth (bandwidth probability) usable by each link (step 1002), and uses the information to set all paths for the traffic (step 1003).

In the path setting procedure performed in step 1003, an objective function and a constraint condition are set based on bandwidth stability and traffic demand information and, as a linear programming problem, paths for the traffic are set so as maximize or minimize the objective function. When the objective function is to maximize the amount of traffic flowing through the network, a path that maximizes the objective function is obtained in the path setting procedure.

THIRD EXAMPLE

The present example involves performing the admission control and control of paths through which traffic flows which have been described in the first example in a distributed manner within a network.

Communication devices 202, 203, and 205 illustrated in FIG. 2 each share the same configuration as communication device 2002 illustrated in FIG. 6 and execute a path control function included in path control device 201.

Operations of a path control method according to the present example will now be briefly described. Upon receiving an admission request from the outside, each of communication devices 202, 203, and 205 performs path control of steps 912 to 916 illustrated in FIG. 8. Subsequently, respective communication devices 203, 204, and 205 mutually notify path control results with each other and exchange traffic information including information regarding what amount of traffic is flowing through which part of the network.

In the present example, since the path control function described in the first example is to exist in a distributed manner within the network, a load of controlling path can be prevented from concentrating on a single device.

FOURTH EXAMPLE

The present embodiment represents a case where a preliminary path is set in addition to setting a path. The present example is realized by using the third embodiment.

Figure 10:
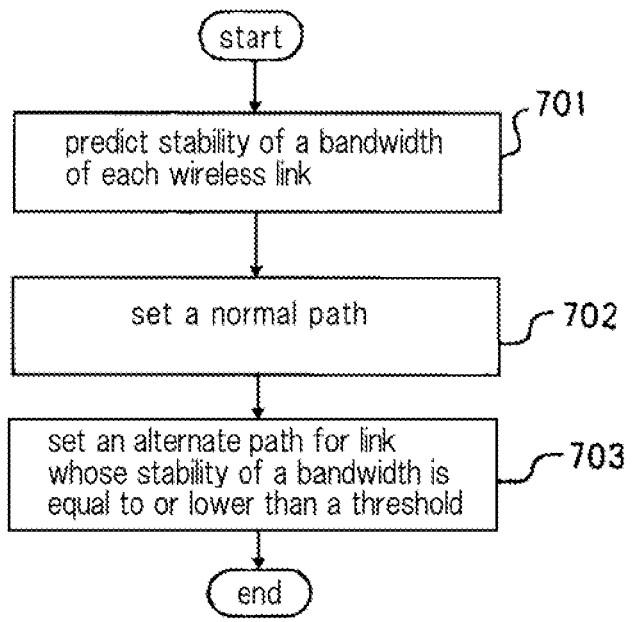
FIG. 10 is a flow chart illustrating an operation procedure in a path control method according to a fourth example.

FIG. 10 is a flow chart illustrating an operation procedure of a path control method according to the present example. Bandwidth predictor 306 of path control device 201 predicts stability of a bandwidth usable by each wireless link or references a combination stability table described in the third embodiment (step 701), and searches for and sets a path based on the information (step 702). Subsequently, preliminary paths are searched for all paths set in step 702 (step 703). Preliminary paths refer to a collection of alternate paths that are prepared in addition to the normal paths set to each wireless link in step 702.

FIFTH EXAMPLE

The present example is a method of computing the stability of a bandwidth usable by a link which differs from the method described in the first example.

The operation of a path control device according to the present example will be described with reference to the flow chart illustrated in FIG. 5. The following description will focus on operations in step 501 illustrated in FIG. 5 of bandwidth predictor 306 illustrated in FIG. 3.

In the present example, it is assumed that the distribution of modulation modes to be used by a wireless link is known in advance. By using the distribution of modulation modes to be used by a wireless link or the distribution of BERs, bandwidth predictor 306 is able to predict the stability of a bandwidth usable by the wireless link.

Using the distribution of modulation modes, the following operation is performed.

Let us assume that QPSK, 16 QAM, 32 QAM, 64 QAM, and 128 QAM respectively correspond to QPSK=0, 16QAM=1, 32QAM=2, 64QAM=3, and 128 QAM=4. Let us also assume that transmission rates that can be realized by the respective modulation modes are 10 Mbps, 20 Mbps, 30 Mbps, 40 Mbps, and 50 Mbps. If the average $\mu(e)$ and the variance $\sigma(e)$ of a frequency of use and the duration of use of the modulation mode to be used by a wireless link are respectively given in accordance with normal distribution as $\mu(e)=3$ and $\sigma(e)=0.4$, then the stability of the bandwidth usable by each wireless link can be determined using such properties.

Since a modulation mode equal to or higher than $[\mu(e)-3\sigma(e)]$ is to be used at a probability of 99.97% or higher, from $$[3-3\times 0.4]=1,$$

it is found that a modulation mode equal to or higher than 16QAM is to be used at a probability of 99.97%.

On the other hand, since a modulation mode equal to or higher than $[\mu(e)-\sigma(e)]$ is to be used at a probability of 84.12% or higher, from $$[3-0.4]=2,$$

it is found that a modulation mode equal to or higher than 32 QAM is to be used at a probability of 84.12%.

Since QPSK that is the lowest modulation mode can at least be maintained, a bandwidth expressed as BW(QPSK)=R (QPSK)=10 Mbps can always be used regardless of a change in modulation mode due to adaptive modulation. In addition, a bandwidth BW(16 QAM) that can be secured by 16 QAM can be expressed as BW(16 QAM)=R(16QAM)–R(QPSK) =10 Mbps, and stability of this bandwidth is 99.97%. On the other hand, a bandwidth BW(32QAM) that can be newly secured by 32 QAM can be expressed as BW(32QAM)=R (32QAM)–R(16QAM)=10 Mbps and has a stability of 84.12%.

Respective bandwidths are classified beforehand according to stability and, upon path setting, which of the bandwidth BW(16 QAM) securable by 16 QAM or the BW(32QAM) securable by 32 QAM can be used is determined based on the state of use by other traffic. Accordingly, a judgment is made as to whether or not an alternate path needs to be set.

SIXTH EXAMPLE

In the present example, the stability of the bandwidth of a link is computed using a method which differs from both the method used in the first example and the method used in the fifth example. The method according to the present example involves computing the stability of a bandwidth of a link based on information regarding modulation modes previously used by each wireless link.

The operation of a path control device according to the present example will be described with reference to the flow chart illustrated in FIG. 5. The following description will focus on operations in step 501 illustrated in FIG. 5 of bandwidth predictor 306 illustrated in FIG. 3.

By computing a proportion concerning which modulation mode had been used for how long during a certain period of time in the past among modulation modes usable by a wireless link, the stability of a bandwidth of the wireless link is computed as described below.

First, let us assume that modulation modes usable by a wireless link are QPSK, 16QAM, 32QAM, and 64QAM. In this case, if the wireless link had used the modulation mode 64QAM for two hours, the modulation mode 32QAM for one hour, and the modulation mode 16QAM for one hour during an interval from the present to four hours in the past, proportions of the interval occupied by the respective modulation modes may be expressed as 64 QAM=½, 32 QAM=¼, 16 QAM=¼, and QPSK=0.

Here, if stability of the modulation mode is assumed to be a proportion occupied by modulation modes equal to or higher than the modulation mode, then respective stabilities may be expressed as 64 QAM=½, 32 QAM=¾, 16 QAM=1, and QPSK=1.

In this case, no problems occur if the traffic is to use a bandwidth (at maximum, BW(16QAM)+BW(QPSK)=20 Mbps) securable by a transmission rate that can be realized by 16QAM or QPSK. On the other hand, when the traffic is to use an additional bandwidth (BW(32QAM)=R(32QAM)–R (16QAM)=30–20=10 Mbps) that is secured by a transmission rate realized when using another modulation mode such as the 32QAM modulation mode, since stability of the bandwidth is ¾, a path other than the link must be prepared. Now, let us assume that a path other than the link has been found and that the stability of the bandwidth to be used by the traffic on the path is ¾. In this case, since the probability of the alternate path also becoming unusable at the same time is $1-(1-¾)\times(1-¾)=15/16$, by having the traffic use the alternate path, a path whose stability is equal to or higher than 90% can be provided and communication quality can be maintained.

SEVENTH EXAMPLE

The present example represents a case where the stability of a link bandwidth is computed using BER. Since the present example is similar to the sixth example with the exception of computation of stability of a bandwidth usable by a link, a description of overlapping portions will be omitted.

In the present example, in step 501 illustrated in FIG. 5, bandwidth predictor 306 uses a past BER of each wireless link as past history information. Link information manager 305 collects a past BER for each modulation mode of a wireless link. Bandwidth predictor 306 refers to information collected by link information manager 305, and for each modulation mode in a certain interval (period of time), computes a proportion in which a BER of the modulation mode occupies a BER required by traffic as the probability in which the modulation mode is usable. The computed probability is set as the stability of a bandwidth that is usable by using the modulation mode.

EIGHTH EXAMPLE

The present example involves improving the accuracy of bandwidth prediction using weather information. Since the present example is similar to the sixth example with the exception of the bandwidth prediction operation, a description of overlapping portions will be omitted.

In the present example, in the bandwidth prediction operation in step 501 illustrated in FIG. 5, for the purpose of improving prediction accuracy, the stability of the bandwidth of each wireless link is predicted based on the result predicted from the rainfall intensity distribution and travel speed and the path of rain clouds obtained from rainfall information acquired in advance and on positional information of the wireless link. Moreover, positional information of wireless links is assumed to be included in advance in connection information managed by topology information manager 304.

NINTH EXAMPLE

The present example involves setting preliminary paths for all paths as a countermeasure for failure in addition to setting an alternate path for a path and link of traffic in the path setting procedure executed by path control device 201.

Figure 11:
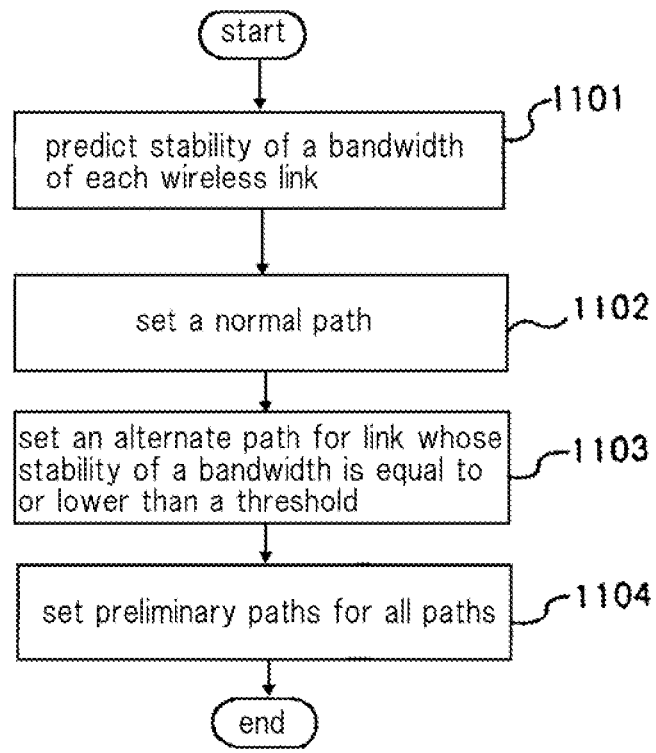
FIG. 11 is a flow chart illustrating a path setting procedure according to a ninth example.

In the present example, a preliminary path is set in addition to a path to be actually used by the traffic. A path setting procedure according to the present example will be described. FIG. 11 is a flow chart illustrating a path setting procedure according to the present example.

As illustrated in FIG. 11, bandwidth predictor 306 performs bandwidth prediction and obtains stability of the bandwidth (step 1101), and path controller 302 refers to information regarding stability of the bandwidth and sets a path to be normally used (step 1102). After setting the normal path, an alternate path is set for links which use a bandwidth that is equal to or lower than a threshold (step 1103). Subsequently, preliminary paths are set for all paths obtained in step 1102 (step 1104). The preliminary paths may be set by obtaining paths using stability of bandwidths in the same manner as the normal path.

As described in the above embodiments and examples, the present invention is for performing path setting and path switching instead of load distribution. According to the present invention, link bandwidths are divided into a plurality of classes according to reliability based on modulation mode history or the like, and when a bandwidth in a low reliability class is to be newly allocated upon path setting, an alternate path is set upon path setting in case that bandwidths of the class become unusable. Subsequently, when a relevant bandwidth becomes unusable, the path of traffic to which the bandwidth is allocated is switched to the alternate path set in advance.

A feature of the present invention is that an alternate path is set in advance for a link depending on each of bandwidths which are classified corresponding to reliability, based on that a bandwidth of a wireless link which performs adaptive modulation, changes significantly by use of a modulation mode, if a bandwidth changes by use of the modulation mode, only path for relevant traffic whose bandwidth changes, will be changed, and thus quality deterioration of all traffics which include a traffic whose path was not changed, can be prevented. In addition, since alternate paths are set only for a part of the paths, network utilization efficiency can be improved.

Moreover, the present invention can be implemented even in a mode where wired links coexist with wireless links. In addition, the present invention can also be realized in a case where a communication device includes functions of a path control device. Furthermore, a plurality of path control devices may be provided in the network in a distributed manner, whereby each of the path control devices may perform the operations described above.

As an example of advantages of the present invention, by predicting stability that is the probability of a bandwidth being usable by a wireless link and controlling the paths of traffic according to the stability, even bandwidths with low stability can be effectively used and a greater amount of traffic not affected by a fluctuation in the transmission rate due to adaptive modulation can be sent over the network.

INDUSTRIAL APPLICABILITY

The present invention is applicable to a wireless broadband system and a mobile network system constituted by wireless links.

While the invention as claimed in the application concerned has been described with reference to embodiments and examples, it is to be understood that the invention is not limited to the embodiments and examples described above. It will be obvious to those skilled in the art that various changes may be made within the scope of the invention to the configurations and details of the invention.

REFERENCE SIGNS LIST

201 path control device
202 to 205 communication device
301 communicator
302, 607 path controller
303, 608 traffic information manager
304, 609 topology information manager
305, 610 link information manager
306, 611 bandwidth predictor
401 to 403, 601 to 603 wireless communicator
404, 604 packet processor
405, 605 path table manager
406, 606 link status manager

The invention claimed is:

1. A path control device comprising:
   a bandwidth predictor that obtains bandwidth probability that corresponds to a bandwidth and that indicates a stability of the bandwidth with respect to a wireless link using adaptive modulation in a network including a communication device that communicates via the wireless link; and
   a path controller that preferentially sets a communication path whose bandwidth probability is higher than a predetermined threshold to the network and prepares an alternate path for a communication path whose bandwidth probability is lower than the predetermined threshold.

2. The path control device according to claim 1, wherein when setting the communication path, said path controller sets a communication path having a traffic communication quality that is equal to or higher than before setting the communication path.

3. The path control device according to claim 1, wherein said bandwidth predictor predicts a modulation mode of the wireless link and computes the bandwidth probability of the wireless link based on a predicted modulation mode.

4. The path control device according to claim 1, wherein said bandwidth predictor computes the bandwidth probability of the wireless link based on a history of a modulation mode used by the wireless link or a history of information indicating a radio wave environment of the wireless link.

5. The path control device according to claim 4, wherein when obtaining the bandwidth probability, the bandwidth probability is computed using statistical distribution information of a history of the modulation mode or a history of the information indicating a radio wave environment.

6. The path control device according to claim 4, wherein the information indicating a radio wave environment includes at least one from among, a bit error rate, a signal to noise ratio, and a carrier to interference-plus-noise ratio.

7. The path control device according to claim 1, wherein said bandwidth predictor predicts a bandwidth probability of the wireless link in correspondence with weather information at a position of the wireless link.

8. The path control device according to claim 1, wherein said path controller sets the prepared alternate path to the network when a transmission rate of a communication path whose bandwidth probability is lower than the threshold declines.

9. The path control device according to claim 1, wherein said path controller sets a preliminary path that combines respective alternate paths of a plurality of the wireless links to the network.

10. A path control method comprising:
obtaining bandwidth probability that corresponds to a bandwidth and that indicates a stability of the bandwidth with respect to a wireless link using adaptive modulation in a network including a communication device that communicates via the wireless link;
preferentially setting a communication path whose bandwidth probability is higher than a predetermined threshold to the network; and
preparing an alternate path for a communication path whose bandwidth probability is lower than the predetermined threshold.

11. The path control method according to claim 10, wherein when setting the communication path, a communication path is set which has a traffic communication quality that is equal to or higher than before setting the communication path.

12. The path control method according to claim 10, wherein when obtaining the bandwidth probability, a modulation mode of the wireless link is predicted and the bandwidth probability of the wireless link is computed based on a predicted modulation mode.

13. The path control method according to claim 10, wherein when obtaining the bandwidth probability, the bandwidth probability of the wireless link is computed based on a history of a modulation mode used by the wireless link or a history of information indicating a radio wave environment of the wireless link.

14. The path control method according to claim 13, wherein when obtaining the bandwidth probability, the bandwidth probability is computed using statistical distribution information of a history of the modulation mode or a history of the information indicating a radio wave environment.

15. The path control method according to claim 13, wherein the information indicating a radio wave environment includes at least one from among, a bit error rate, a signal to noise ratio, and a carrier to interference-plus-noise ratio.

16. The path control method according to claim 10, wherein when obtaining the bandwidth probability, a bandwidth probability of the wireless link is predicted in correspondence with weather information at a position of the wireless link.

17. The path control method according to claim 10, wherein the prepared alternate path is set to the network when a transmission rate of a communication path whose bandwidth probability is lower than the threshold declines.

18. The path control method according to claim 10, wherein a preliminary path that combines respective alternate paths of a plurality of the wireless links is set to the network.

19. A non-transitory computer-readable medium having a computer program which causes a computer that sets a communication path to a network including a communication device that communicates via a wireless link using adaptive modulation to:
obtain bandwidth probability that corresponds to a bandwidth and that indicates a stability of the bandwidth with respect to the wireless link;
preferentially set a communication path whose bandwidth probability is higher than a predetermined threshold to the network; and
prepare an alternate path for a communication path whose bandwidth probability is lower than the predetermined threshold.

* * * * *